Feb. 18, 1941.  K. E. BEMIS  2,232,203
BROILER
Filed Sept. 10, 1940

Inventor
Kenneth E. Bemis
By Philip A. Friedell
Attorney

Patented Feb. 18, 1941

2,232,203

UNITED STATES PATENT OFFICE 2,232,203

BROILER

Kenneth E. Bemis, Oakland, Calif.

Application September 10, 1940, Serial No. 356,137

18 Claims. (Cl. 53—5)

This invention, a broiler, establishes a new method of broiling meats and provides broiled steaks of the highest degree of palatability because there can be contamination by gases, charred juices, or the products of combustion, and the broiling temperature can be adjusted and controlled to produce the most desirable degree of braising and cooking.

In the customary processes of broiling meats, the meat is placed on a grill either above or below an open flame or in close proximity to unprotected electrical heating units. With the open-fire type of broiler, the gases from the fire circulate about and contaminate the meat with the flavor imparted by them and also create an uneven searing action because an absolutely uniform flame throughout the area of the steak cannot be established or maintained.

If the meat to be broiled is placed above the flame, juices drop down onto the burner and are decomposed and charred and the gases produced contaminate the meat with unnatural flavors. If placed below the flame, the upper surface of the meat is seared while the lower portion remains practically cold, and the gases come in contact with the meat and alter its flavor. The electrical heating elements cannot be cleaned of the charred and charring decomposed juices, and gas burners cannot be cleaned after each broiling operation, for practical reasons.

When the meat is broiled between vertical heating units, the juices sputter onto the unit and are decomposed by the heat and have the same effect as when the heating means is placed above or below the meat, and the units cannot be cleaned.

With this invention it is impossible for the gases or products of combustion to come in contact with the meat because at no time is the meat exposed to an open flame or directly to a heating unit, but instead is broiled on the hot top of a range or hot plate which is heated by a suitable source such as gas from beneath. The range top or hot plate has a perfectly smooth surface which is easily scraped and polished or cleaned following each broiling operation, therefore there can be no contamination from decomposed collected juices, and for these reasons there can be no alteration in flavor. The meat is broiled over a hot surface, in extremely close proximity but not in actual contact, and a range top or hot plate can be kept very uniform in temperature throughout the entire area of a steak.

The success of the broiling operation is dependent upon a grid formed of members of the smallest practical cross-section consistent with the requirements of support, and this grid must lie flat on the hot top and the members should be so spaced as to permit the major portion or area of the steak to almost but not quite touch the hot plate. Larger wires require a more intense heat and will not result in such uniform cooking as the smaller wires. The grid should have just sufficient rigidity to support a single steak without undue flexure when the grid is raised above the hot top.

The preferred form of grid is one composed of hairpin-shaped wires or rods of about 14 to 16 gauge and in which the terminal ends of the wires are fixed to a support with the return bend ends free. The securing of both ends would result in buckling due to uneven thermal expansion between the respective wires.

This invention further contemplates the provision of automatic timing means to regulate the time of direct broiling, and also means for supporting the meat following broiling in a position in which it will be no longer subjected to a broiling temperature while being maintained in a position where the meat will be kept hot until it is to be turned or served.

The objects of the invention are as follows:

First; to provide a new method of broiling meat in which the meat is maintained out of contact with gases and products of combustion and of decomposed meat juices while being broiled in a horizontal position for uniformity of cooking.

Second; to provide a broiling device which is formed of members of small cross-section for close relationship between the meat and a hot top and with just sufficient rigidity to support a steak thereon without undue deflection.

Third; to provide a broiling device in which hairpin-shaped wires are used as the supporting medium and which wires are fixed only at their terminal ends in a suitable support with the return bend ends free to expand, to obviate buckling created through any uneven heating of the several wires.

Fourth; to provide a broiling device of the type outlined which is conveniently and quickly movable to a position clearing the hot top for convenient cleaning of the hot top following each broiling operation.

Fifth; to provide a broiler as outlined with means for automatically timing the broiling operation and for moving the broiled meat from the hot top or broiling zone to a heat maintenance zone coincident with expiration of the broiling period.

In describing the invention reference will be made to the accompanying drawing in which:

Fig. 9 illustrates the quick-release means to permit moving the grid to a position clearing the hot top for cleaning the hot top following each broiling operation.

Figures 1, 2:
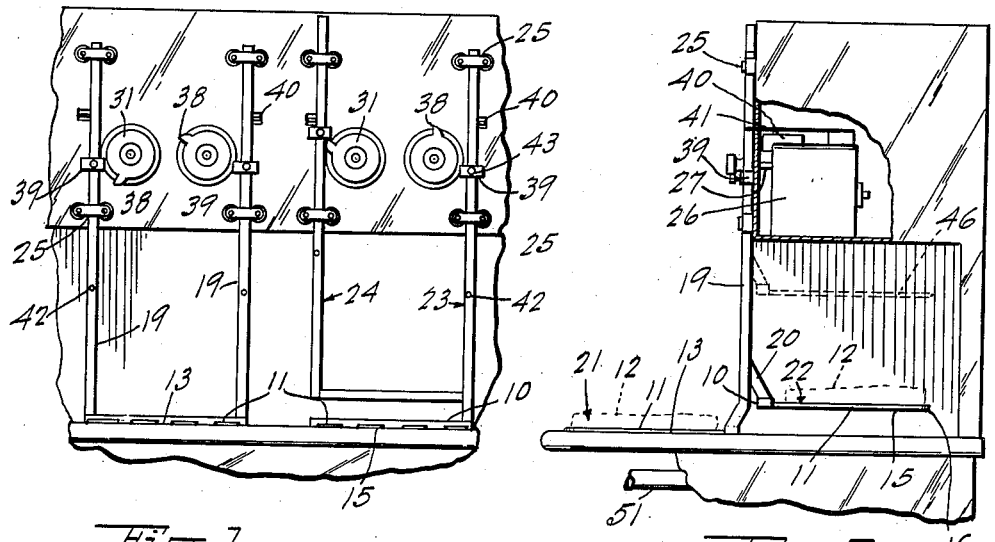
Fig. 1 is a front elevation of the invention shown applied to a cooking range which is fragmentarily shown.
Fig. 2 is a side elevation of Fig. 1.
Figure 3:
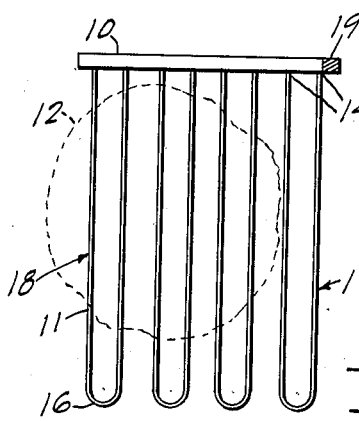
Fig. 3 is a plan view of the broiler grid.
Figure 4:
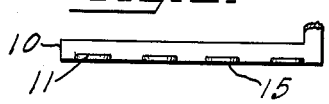
Fig. 4 is a front elevation of Fig. 3.

The most essential feature of the invention is illustrated in Figs. 3 and 4 and which is the preferred form of grid, and which consists of a supporting bar 10 and a plurality of supporting fingers 11 each of which is formed of a comparatively thin wire having a cross-sectional area only sufficient to support its portion of the meat 12. The most practical size of wire was found to be around 14 to 16 gauge. Wires smaller than 16 gauge appear to flex excessively while larger than 14 gauge require increasingly excessive heat from the hot plate or hot top 13.

Figure 8:
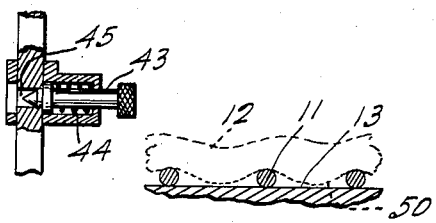
Fig. 8 illustrates the relation between the meat, the grid and the hot plate.
Figure 7:
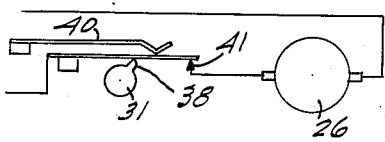
Fig. 7 is a wiring diagram of the motor circuit for the timer.

These fingers are preferably of hairpin or return-bend form with their terminal ends fixedly attached to the supporting bar 10 as indicated at 14 and with their undersurfaces 15 in the same plane as the undersurface of the supporting bar, so that these fingers will lie flat on the hot top of the range or hot plate as shown in Fig. 8.

No support is shown for the return-bend ends 16 of the wires since the supports must be free to expand or contract independently under the influence of temperature changes. If a support is provided for the return-bend ends they must not be fixed to the support. To tie both ends of the wires in any manner would result in buckling, since a finger 17 which was not supporting a portion of the meat or a lesser portion than other fingers 18, would become hotter and expand out of proportion to the other fingers. Thus it will be noted that it is essential that the grid members be free at one end for individual thermal expansion and contraction.

The supporting bar 10 has integral therewith or attached thereto a lifting rod 19 by means of which the broiler with its broiled steak is raised above the hot top when the broiling operation is completed.

These lifter rods are indicated as offset at 20 so that when the broilers are located in opposition as indicated at 21 and 22, the supporting bars will clear each other. This locates the lifter rod of one broiler at the right and the other at the left as indicated at 23 and 24 and the broilers can all be made identical. Suitable guides 25 maintain the broilers parallel to the top of the stove and permit raising and lowering of the broilers at will.

Figure 5:
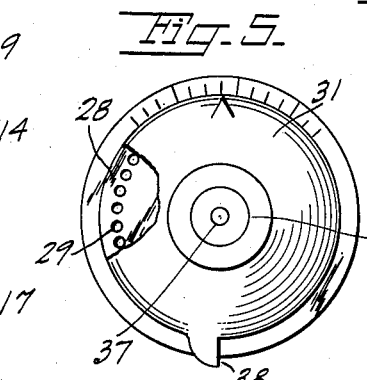
Fig. 5 is a front view of the timing mechanism.
Figure 6:
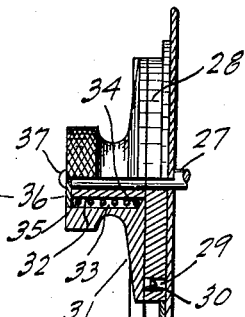
Fig. 6 is a side elevation of Fig. 5 with one half shown in section.

A timing device is provided for each lifter rod, and the right and left hand lifter rods are shown as controlled by separate timing devices individually driven. The preferred form of timing device is illustrated in Figs. 5 and 6 and is fully disclosed in my copending application Serial Number 356,138 filed Sept. 10, 1940.

This timing device is extremely simple in construction and operation and consists of a slow speed or backgeared motor 26 driving its shaft 27 at a very slow speed—about one revolution in five minutes for this particular purpose. Fixed on the drive shaft 27 is a clutch plate 28 which is provided with a circular series of holes 29 into which a pin 30 slidably fits and which pin is fixed in the dial 31.

The dial 31 is rotatable on the hub 32 of the clutch plate 28 and the counterbore 33 forms a shoulder 34 on which the compression spring 35 seats, the other end of the spring being retained by a disc 36 which is secured to the end of the shaft 27 by means of a screw 37. Thus the dial can be manually retracted against the action of the spring, and rotated to cause engagement of the pin 30 in any of the holes 29, and when released, the spring will force the dial back to its position in contact with the clutch plate.

This dial has a finger 38 cooperatively related to the shoe 39 which is mounted on the lifter rod, and the shoe 39 is cooperatively related to the spring 40 which normally keeps the normally-open circuit "Microswitch" 41 closed.

The operation of the invention is as follows:

When inoperative, the broilers are all in the raised position of broiler 22. The top of the stove is maintained at a suitable temperature. The steak 12 is prepared, the dial 31 of its timer is retracted, rotated and adjusted to the desired time elapse period of broiling, which operation coincidentally lowers the grid onto the hot top. The steak is laid on the grid which now lies flat on the hot top. The lowering of the grid through adjustment of the timer dial releases the spring 40 to close the switch 41 which completes circuit to the motor and starts operation of the timing device. This motor drives the dial in a direction in which the finger 38 will engage the underside of the shoe 39 during the latter portion of the time cycle, and following this engagement the broiler is slowly lifted from the hot top to the position indicated at 22. As the broiler reaches this last position, the shoe 39 engages and lifts the spring 40 allowing the "Microswitch" 41 to break circuit to the motor 26, while the meat is supported on the grid in heat-maintaining relation to the hot top. The operation described is repeated for broiling the other side of the meat, and at the conclusion of the second operation, the meat is maintained out of broiling relation, but in heat-maintaining relation to the hot top and kept hot until it is ready to be served.

The shoes 39 are made quickly releasable as shown in Fig. 9, in which a pin 43 is urged by a spring 44 to seat in a suitable aperture 45 formed through the lifter rod, and another aperture is formed at a lower point 42. Following each broiling operation, the plunger 43 is retracted and slid down against the top of the guide 25 and the lifter rod is manually raised, the plunger 43 entering the aperture 42 and supporting the grid in the position indicated at 46 so that the hot top may be conveniently cleaned, thus assuring the most delectable steaks in all cases.

Figure 10:
Fig. 10 shows a modification of the grid structure, with the supports shown in section.

In Fig. 10 a modification is shown in which wires are mounted in a frame and supported at both ends. The wires 47 are fixed at one end 48 while the other end 49 is free to advance or retract in conformity with thermal effects. The free ends 49 are offset as indicated so that the supporting portion, 47, will lie flat on the hot top or stove.

As illustrated in Fig. 8, the meat 12 lays on top of the wires 11 which lie flat on the stove top, and the thickness of the wires and the spacing is such as to practically allow the meat to touch the surface of the hot top as indicated at 50.

Other types of timing devices could be used, but due to its simplicity and rapidity of adjustment, and the fact that adjustment of the device coincidently initiates operation of the device which it controls, the timing device illustrated is preferred.

Suitable burners 51 are provided for heating the hot top or stove top 13.

I claim:

1. In combination with a hot plate and means for heating said hot plate; a wire grid formed to lie flat on said hot plate and forming a support to support a steak out of direct contact with but in close proximity to said plate, the wires forming the grid having the least cross-sectional area necessary for supporting the steak when the grid is unsupported by the hot plate and to permit close relationship between the hot plate and the steak.

2. A structure as defined in claim 1 in which said grid is formed of wire having a diameter less than one-quarter inch, and in which the grid consists of a supporting bar and hairpin-shaped wires with their terminal ends fixed to the bar and the return bend ends free, and with the bottom of said bar and the undersurface of said wires in the same plane.

3. A broiler grid comprising a supporting bar; a plurality of hairpin-shaped wires having their terminal ends fixed to said bar with the undersurface of the bar and the undersurface of the wires in the same plane to lie flat on a hot plate and in absolute contact therewith, said wires being otherwise free to prevent buckling under differences in expansion due to temperature changes and variations between the several wires.

4. A structure as defined in claim 1; a lifter rod attached to said grid for lifting the grid from said hot plate, and guiding means for said lifter rod for maintaining a coplanar relation between said grid and said hot plate.

5. A structure as defined in claim 1; a lifter rod attached to said grid for lifting the grid from said hot plate; guiding means for said lifter rod for maintaining said grid parallel to said hot plate; and timing means including lifting means cooperatively related to said lifter rod and engaging said lifter rod following a predetermined portion of the time for which said timing means is made operative, for lifting said grid above said hot plate.

6. A broiler comprising a grid formed to lie flat on a hot plate and to support a steak at spaced points and in close relationship to said hot plate; a support for the grid and a lifter rod fixed to said support; said grid being formed of members of minimum thickness necessary for support of a steak when the grid is removed from the hot plate.

7. A structure as defined in claim 6, guides for said lifter rod; a timing device including lifting means cooperatively related to said lifter rod and cooperating therewith following a predetermined period of operation of said timing device for lifting said grid to a predetermined plane above said hot plate and thereafter maintaining said grid in its raised position.

8. A structure as defined in claim 6, in which said grid consists of a supporting bar and a plurality of hairpin-shaped wires with the terminal ends of the wires affixed to said supporting bar with the undersurface of the wires in the same plane as the undersurface of the bar, to lie flat on the top of the hot plate; the return bend ends of said wires being free of support other than the inherent rigidity to permit free thermal expansion of the individual wires.

9. A structure as defined in claim 6; guiding means for said lifter rod; a shoe releasably mounted on said lifter rod; timing means including lifting means cooperatively related to said shoe and cooperating therewith following a predetermined period of operation of said timing means for lifting said grid to a plane above said hot plate and in heat maintaining relation thereto.

10. A structure as defined in claim 6; guiding means for said lifter rod; a shoe releasably mounted on said lifter rod to permit manual lifting of said grid to a position above said hot plate to permit cleaning of the plate; timing means including lifting means and a motor and a circuit therefor and means for manually adjusting the time elapse periods of said timing means at will; said lifting means being cooperatively related to said shoe and cooperating therewith to lift the grid from the hot plate following a predetermined period of operation of said timing means; means cooperatively related to said shoe for breaking said circuit when said lifting means has raised said lifter rod to its terminal of travel and making circuit when said lifter rod is released by manual adjustment of said timing means.

11. A broiler comprising a grid composed of spaced members of comparatively small cross-section to support a steak out of absolute contact with, but in close proximity to a range top on which the grid is supportable, and having the undersurface of all members in the same plane to lie flat on the range top; said members consisting of hairpin-shaped wires and a support for the terminal ends of the wires, the return bend ends of the wires being self-supporting with the cross-sectional area of the wires being sufficient only to support a steak without undue flexure when the grid is raised above the range top.

12. A broiler comprising a grid composed of spaced members of comparatively small cross-section to support a steak out of absolute contact with, but in close proximity to a range top on which the grid is supportable, and having the undersurface of all members in the same plane to lie flat on the range top; a lifter rod for said grid; guiding means for said lifter rod; a shoe on said lifter rod and means for manually freeing said shoe at will; timing means including lifting means and driving means for said timing means and means for manually adjusting the time-elapse periods of said timing means; said lifting means being cooperatively related to said shoe and cooperating therewith to lift the grid during the latter portion of the time-elapse period of said timing means and to support the grid in its raised position.

13. A broiler comprising a supporting bar, a plurality of hairpin-shaped wires of small cross-section having their terminal ends affixed in spaced relation to said bar along the lower edge thereof to lie flat on a hot plate; said wires being otherwise free of restraint when raised above the hot plate and having sufficient cross-sectional area only to support a steak without prohibitive flexure when the broiler is in a position unsupported by the hot plate.

14. A structure as defined in claim 13; a lifter rod affixed to one end of said supporting bar and extending vertically therefrom; guides for said lifter rod; and lifting means and timing means therefor cooperatively related to said lifter rod and cooperating therewith to raise the broiler to a position above the hot plate following predetermined operation of said timing means.

15. A structure as defined in claim 13; a lifter rod affixed to one end of said supporting bar and extending vertically therefrom; guides for said lifter rod; a shoe releasably mounted on said lifter rod and manually movable and securable in two positions, in one of which the broiler grid is supported on the hot plate and in the other of which the broiler grid is supported in a position above the hot plate to permit cleaning of the hot plate.

16. A structure as defined in claim 13; a lifter rod affixed to one end of said supporting bar and extending vertically therefrom; guides for said lifter rod; a shoe releasably mounted on said lifter rod and manually releasable to permit manual raising of the grid for cleaning the hot plate; lifting means cooperatively related to said shoe and driving means for said lifting means; said lifting means including timing means manually adjustable for adjusting the time-elapse period of broiling; manual adjustment of said timing means coincidently lowering said grid onto the hot plate, and said lifting means cooperating with said shoe to raise the grid to a plane above the hot plate during the latter portion of a cycle of operation of said timing means.

17. A structure as defined in claim 13; lifting means for said grid, and manually adjustable timing means and driving means for controlling and operating the lifting means and timing means; and means controlled by said timing means and lifting means for terminating operation of the driving means when a cycle of operation of said timing means and lifting means has been completed.

18. A broiler comprising a grid supportable on a hot plate and means for heating the hot plate; a lifter rod affixed to and extending upwardly from said grid; a shoe releasably secured on said lifter rod; guides for said lifter rod; manually adjustable timing means including lifting means cooperatively related to said shoe and cooperating therewith to lift the grid from the hot plate following a predetermined period of operation of said timing means; driving means for said timing means including lifting means; and means controlling said driving means and operatively associated with said lifting means for terminating operation of said driving means when said lifting means has raised said grid to a predetermined elevation above said hot plate; manual adjustment of said timing means coincidently operating to lower said grid onto said hot plate and to make operative said driving means.

KENNETH E. BEMIS.